United States Patent
Price et al.

(10) Patent No.: US 9,214,026 B2
(45) Date of Patent: Dec. 15, 2015

(54) BELIEF PROPAGATION AND AFFINITY MEASURES

(71) Applicant: Adobe Systems Incorporated, San Jose, CA (US)

(72) Inventors: Brian L. Price, San Jose, CA (US); Scott D. Cohen, Sunnyvale, CA (US); Chenxi Zhang, Lexington, KY (US)

(73) Assignee: Adobe Systems Incorporated, San Jose, CA (US)

( * ) Notice: Subject to any disclaimer, the term of this patent is extended or adjusted under 35 U.S.C. 154(b) by 57 days.

(21) Appl. No.: 13/722,825

(22) Filed: Dec. 20, 2012

(65) Prior Publication Data

US 2014/0177903 A1  Jun. 26, 2014

(51) Int. Cl.
*G06K 9/00* (2006.01)
*G06T 7/00* (2006.01)

(52) U.S. Cl.
CPC ............. *G06T 7/0075* (2013.01); *G06T 7/0081* (2013.01); *G06T 7/0087* (2013.01); *G06T 2207/10012* (2013.01); *G06T 2207/20076* (2013.01)

(58) Field of Classification Search
None
See application file for complete search history.

(56) References Cited

U.S. PATENT DOCUMENTS

| | | | |
|---|---|---|---|
| 4,591,928 A | 5/1986 | Bloom et al. | |
| 5,151,998 A | 9/1992 | Capps | |
| 5,652,828 A | 7/1997 | Silverman | |
| 5,671,283 A | 9/1997 | Michener et al. | |
| 6,122,375 A | 9/2000 | Takaragi et al. | |
| 6,208,348 B1 | 3/2001 | Kaye | |
| 6,266,412 B1 | 7/2001 | Berenzweig et al. | |
| 6,316,712 B1 | 11/2001 | Laroche | |
| 6,333,983 B1 | 12/2001 | Enichen | |
| 6,370,247 B1 | 4/2002 | Takaragi et al. | |
| 6,480,957 B1 | 11/2002 | Liao et al. | |
| 6,778,667 B1 | 8/2004 | Bakhle et al. | |
| 6,792,113 B1 | 9/2004 | Ansell et al. | |
| 6,804,355 B1 | 10/2004 | Graunke | |
| 7,003,107 B2 | 2/2006 | Ananth | |
| 7,103,181 B2 | 9/2006 | Ananth | |
| 7,130,467 B1 * | 10/2006 | Bronder et al. | 382/218 |
| 7,142,669 B2 | 11/2006 | Dworkin et al. | |
| 7,200,226 B2 | 4/2007 | Bace | |
| 7,213,156 B2 | 5/2007 | Fukuda | |
| 7,218,733 B2 | 5/2007 | Li et al. | |
| 7,221,756 B2 | 5/2007 | Patel et al. | |
| 7,269,664 B2 | 9/2007 | Hutsch et al. | |
| 7,269,854 B2 | 9/2007 | Simmons et al. | |

(Continued)

OTHER PUBLICATIONS

Yang et al. "Stereo Matching with Color-Weighted Correlation, Hierarchical Belief Propagation, and Occlusion Handling", Mar. 2009, IEEE Transactions on Pattern Analysis and Machine Intelligence, vol. 31, No. 3.*

(Continued)

*Primary Examiner* — Jason Heidemann
(74) *Attorney, Agent, or Firm* — Wolfe-SBMC (57) ABSTRACT

Belief propagation and affinity measure techniques are described. In one or more implementations, beliefs may be formed to solve a labeling problem for a node, such as to perform image processing. An affinity measure may be calculated that describes how similar the node is to another node. This affinity measure may then be used as a basis to determine whether the share the belief formed for the node with the other node to solve a labeling problem for the other node.

20 Claims, 7 Drawing Sheets

(56) References Cited

U.S. PATENT DOCUMENTS

| | | | |
|---|---|---|---|
| 7,400,744 B2 | 7/2008 | Nichani et al. |
| 7,412,060 B2 | 8/2008 | Fukuda |
| 7,418,100 B2 | 8/2008 | McGrew et al. |
| 7,603,563 B2 | 10/2009 | Ansell et al. |
| 7,636,691 B2 | 12/2009 | Maari |
| 7,680,269 B2 | 3/2010 | Nicolai et al. |
| 7,693,278 B2 | 4/2010 | Hiramatsu |
| 7,715,591 B2 | 5/2010 | Owechko et al. |
| 7,827,408 B1 | 11/2010 | Gehringer |
| 7,836,311 B2 | 11/2010 | Kuriya et al. |
| 7,861,312 B2 | 12/2010 | Lee et al. |
| 7,884,854 B2 | 2/2011 | Banner et al. |
| 7,924,323 B2 | 4/2011 | Walker et al. |
| 8,051,287 B2 | 11/2011 | Shetty et al. |
| 8,082,592 B2 | 12/2011 | Harris |
| 8,095,795 B2 | 1/2012 | Levy |
| 8,099,519 B2 | 1/2012 | Ueda |
| 8,103,505 B1 | 1/2012 | Silverman et al. |
| 8,130,952 B2 | 3/2012 | Shamoon et al. |
| 8,184,182 B2 | 5/2012 | Lee et al. |
| 8,189,769 B2 | 5/2012 | Ramasamy et al. |
| 8,199,216 B2 | 6/2012 | Hwang |
| 8,245,033 B1 | 8/2012 | Shetty et al. |
| 8,291,219 B2 | 10/2012 | Eto |
| 8,300,812 B2 | 10/2012 | Van De Ven |
| 8,315,396 B2 | 11/2012 | Schreiner et al. |
| 8,345,976 B2 | 1/2013 | Wang et al. |
| 8,390,704 B2 | 3/2013 | Wang et al. |
| 8,417,806 B2 | 4/2013 | Chawla et al. |
| 8,428,390 B2 | 4/2013 | Li et al. |
| 8,447,098 B1 | 5/2013 | Cohen et al. |
| 8,520,083 B2 | 8/2013 | Webster et al. |
| 8,543,386 B2 | 9/2013 | Oh et al. |
| 8,548,226 B2 | 10/2013 | Sakano et al. |
| 8,571,305 B2 | 10/2013 | Kao |
| 8,571,308 B2 | 10/2013 | Grafulla-González |
| 8,583,443 B2 | 11/2013 | Misawa |
| 8,586,847 B2 | 11/2013 | Ellis et al. |
| 8,615,108 B1 | 12/2013 | Stoppa et al. |
| 8,619,082 B1 | 12/2013 | Ciurea et al. |
| 8,694,319 B2 | 4/2014 | Bodin et al. |
| 8,731,913 B2 | 5/2014 | Zopf et al. |
| 8,738,633 B1 | 5/2014 | Sharifi et al. |
| 8,805,560 B1 | 8/2014 | Tzanetakis et al. |
| 8,855,334 B1 | 10/2014 | Lavine et al. |
| 8,879,731 B2 | 11/2014 | Schultz |
| 8,886,543 B1 | 11/2014 | Sharifi et al. |
| 8,903,088 B2 | 12/2014 | Schultz |
| 8,914,290 B2 | 12/2014 | Hendrickson et al. |
| 8,953,811 B1 | 2/2015 | Sharifi et al. |
| 9,064,318 B2 | 6/2015 | Price et al. |
| 9,076,205 B2 | 7/2015 | Cho et al. |
| 9,135,710 B2 | 9/2015 | Cohen et al. |
| 2002/0154779 A1 | 10/2002 | Asano et al. |
| 2004/0030656 A1 | 2/2004 | Kambayashi et al. |
| 2004/0254660 A1 | 12/2004 | Seefeldt |
| 2005/0015343 A1 | 1/2005 | Nagai et al. |
| 2005/0201591 A1 | 9/2005 | Kiselewich |
| 2005/0232463 A1 | 10/2005 | Hirvonen et al. |
| 2006/0045211 A1 | 3/2006 | Oh et al. |
| 2006/0078194 A1 | 4/2006 | Fradkin et al. |
| 2006/0122839 A1 | 6/2006 | Li-Chun Wang et al. |
| 2006/0165240 A1 | 7/2006 | Bloom et al. |
| 2006/0173846 A1 | 8/2006 | Omae et al. |
| 2007/0041663 A1* | 2/2007 | Cho et al. ............... 382/299 |
| 2007/0061145 A1 | 3/2007 | Edgington et al. |
| 2007/0070226 A1 | 3/2007 | Matusik et al. |
| 2007/0087756 A1 | 4/2007 | Hoffberg |
| 2007/0291958 A1 | 12/2007 | Jehan |
| 2008/0120230 A1 | 5/2008 | Lebegue et al. |
| 2009/0055139 A1 | 2/2009 | Agarwal et al. |
| 2009/0125726 A1 | 5/2009 | Iyer et al. |
| 2009/0259684 A1 | 10/2009 | Knight et al. |
| 2009/0276628 A1 | 11/2009 | Cho et al. |
| 2009/0279697 A1 | 11/2009 | Schneider |
| 2009/0290710 A1 | 11/2009 | Tkachenko et al. |
| 2009/0306972 A1 | 12/2009 | Opitz et al. |
| 2009/0307489 A1 | 12/2009 | Endoh |
| 2009/0315670 A1 | 12/2009 | Naressi et al. |
| 2010/0105454 A1 | 4/2010 | Weber |
| 2010/0153747 A1 | 6/2010 | Asnaashari et al. |
| 2010/0172567 A1 | 7/2010 | Prokoski |
| 2010/0208779 A1 | 8/2010 | Park et al. |
| 2010/0246816 A1 | 9/2010 | Thomas et al. |
| 2010/0257368 A1 | 10/2010 | Yuen |
| 2010/0279766 A1 | 11/2010 | Pliska et al. |
| 2010/0322042 A1 | 12/2010 | Serletic et al. |
| 2011/0043864 A1 | 2/2011 | Tian et al. |
| 2011/0112670 A1 | 5/2011 | Disch et al. |
| 2011/0131219 A1 | 6/2011 | Martin-Cocher et al. |
| 2011/0161669 A1 | 6/2011 | Eto |
| 2011/0173208 A1 | 7/2011 | Vogel |
| 2011/0230987 A1 | 9/2011 | Anguera Miró et al. |
| 2012/0042167 A1 | 2/2012 | Marking et al. |
| 2012/0046954 A1 | 2/2012 | Lindahl et al. |
| 2012/0056982 A1 | 3/2012 | Katz et al. |
| 2012/0173865 A1 | 7/2012 | Swaminathan |
| 2012/0173880 A1 | 7/2012 | Swaminathan |
| 2012/0216300 A1 | 8/2012 | Vivolo et al. |
| 2012/0219229 A1 | 8/2012 | Springer et al. |
| 2012/0321172 A1 | 12/2012 | Jachalsky et al. |
| 2013/0064443 A1* | 3/2013 | Schlosser ............... G06T 7/0075 382/154 |
| 2013/0113881 A1 | 5/2013 | Barnum |
| 2013/0127824 A1 | 5/2013 | Cohen |
| 2013/0132733 A1 | 5/2013 | Agrawal et al. |
| 2013/0142330 A1 | 6/2013 | Schultz |
| 2013/0142331 A1 | 6/2013 | Schultz |
| 2013/0173273 A1 | 7/2013 | Kuntz et al. |
| 2013/0191491 A1 | 7/2013 | Kotha et al. |
| 2013/0243313 A1* | 9/2013 | Civit ............... G06T 5/002 382/164 |
| 2013/0243314 A1* | 9/2013 | Civit ............... G06T 7/0081 382/164 |
| 2013/0290818 A1 | 10/2013 | Arrasvuori et al. |
| 2013/0343606 A1 | 12/2013 | Dal Mutto et al. |
| 2014/0023291 A1 | 1/2014 | Lin |
| 2014/0119643 A1 | 5/2014 | Price |
| 2014/0135962 A1 | 5/2014 | King et al. |
| 2014/0136976 A1 | 5/2014 | King et al. |
| 2014/0140626 A1 | 5/2014 | Cho |
| 2014/0142947 A1 | 5/2014 | King |
| 2014/0148933 A1 | 5/2014 | King |
| 2014/0152776 A1 | 6/2014 | Cohen |
| 2014/0153816 A1 | 6/2014 | Cohen |
| 2014/0168215 A1 | 6/2014 | Cohen |
| 2014/0169660 A1 | 6/2014 | Cohen |
| 2014/0201630 A1 | 7/2014 | Bryan |
| 2014/0310006 A1 | 10/2014 | Anguera Miro et al. |

OTHER PUBLICATIONS

Su et al. "Over-Segmentation Based Background Modeling and Foreground Detection with Shadow Removal by Using Hierarchical MRFs", 2011 ACCV 2010, Part III, LNCS 6494, pp. 535-546.*

Xiao et al., Joint Affinity Propagation for Multiple View Segmentation, ICCV 2007, Retrieved from: <http://vision.cs.princeton.edu/projects/2007/ICCV/paper_high-res.pdf >.*

Dueck et al., Non-metric affinity propagation for unsupervised image categorization, ICCV 2007, Retrieved From: <http://www.cs.columbia.edu/~delbert/ >.*

Kubo, Shiro et al., "Characterization of the Tikhonov Regularization for Numerical Analysis of Inverse Boundary Value Problems by Using the Singular Value Decomposition", Inverse Problems in Engineering Mechanics, 1998, pp. 337-344.

"Non-Final Office Action", U.S. Appl. No. 13/309,982, (Jan. 17, 2013), 32 pages.

"Non-Final Office Action", U.S. Appl. No. 13/310,032, (Jan. 3, 2013),18 pages.

He, et al., "Corner detector based on global and local curvature properties", Retrieved from <http://hub.hku.hk/bitstream/10722/57246/1/142282.pdf> on Dec. 21, 2012, (May 2008),13 pages.

(56) References Cited

OTHER PUBLICATIONS

Hirsch, et al., "Fast Removal of Non-uniform Camera Shake", Retrieved from <http://webday.is.mpg.de/pixel/fast_removal_of_camera_shake/files/Hirsch_ICCV2011_Fast%20removal%20of%20non-uniform%20camera%20shake.pdf> on Dec. 21, 2012.
Jia, Jiaya "Single Image Motion Deblurring Using Transparency", Retrieved from <http://www.cse.cuhk.edu.hk/~leojia/all_final_papers/motion_deblur_cvpr07.pdf> on Dec. 21, 2012, 8 pages.
Levin, et al., "Image and Depth from a Conventional Camera with a Coded Aperture", ACM Transactions on Graphics, SIGGRAPH 2007 Conference Proceedings, San Diego, CA, Retrieved from <http://groups.csail.mit.edu/graphics/CodedAperture/CodedAperture-LevinEtAl-SIGGRAPH07.pdf> on Dec. 21, 2012,(2007), 9 pages.
Yuan, et al., "Image Deblurring with Blurred/Noisy Image Pairs", Proceedings of ACM SIGGRAPH, vol. 26, Issue 3, (Jul. 2007),10 pages.
"Final Office Action", U.S. Appl. No. 13/309,982, (Nov. 1, 2013), 34 pages.
"Final Office Action", U.S. Appl. No. 13/310,032, (Oct. 31, 2013), 21 pages.
Felzenszwalb, Pedro F., et al., "Efficient Belief Propagation for Early Vision", International Journal of Computer Vision, 70(1), (2006), pp. 41-54.
Gastal, Eduardo S., et al., "Shared Sampling for Real-Time Alpha Matting", Eurographics 2010, vol. 29, No. 2, (2010),10 pages.
He, Kaiming et al., "A Global Sampling Method for Alpha Matting", CVPR 2011, (2011), pp. 2049-2056.
Levin, Anat et al., "A Closed Form Solution to Natural Image Matting", CVPR, 2006, (2006), 8 pages.
Park, Youngja et al., "Extracting Salient Keywords from Instructional Videos Using Joint Text, Audio and Visual Cues", Proceedings of the Human Language Technology Conference of the North American Chapter of the ACL, Association for Computational Linguistics, 2006,(Jun. 2006), pp. 109-112.
Radhakrishnan, Regunathan et al., "A Content-Adaptive Analysis and Representation Framework for Audio Event Discovery from "Unscripted" Multimedia", Hindawi Publishing Corporation, EURASIP Journal on Applied Signal Processing, vol. 2006, Article ID 89013, (2006), 24 pages.
Smaragdis, Paris "A Probabilistic Latent Variable Model for Acoustic Modeling", NIPS (2006), 6 pages.
Smaragdis, Paris "Supervised and Semi-Supervised Separation of Sounds from Single-Channel Mixtures", ICA'07 Proceedings of the 7th international conference on Independent component analysis and signal separation, (2007), 8 pages.
Smith, Alvy R., et al., "Blue Screen Matting", SIGGRAPH 96 Conference Proceedings, (Aug. 1996),10 pages.
Yang, Qingxiong et al., "A Constant-Space Belief Propagation Algorithm for Stereo Matching", CVPR (2010), 8 pages.
"Final Office Action", U.S. Appl. No. 13/690,755, Sep. 10, 2014, 7 pages.
"Non-Final Office Action", U.S. Appl. No. 13/660,159, Oct. 1, 2014, 7 pages.
"Supplemental Notice of Allowance", U.S. Appl. No. 13/310,032, Nov. 3, 2014, 4 pages.
Zhu, et al.,' "Fusion of Time-of-Flight Depth and Stereo for High Accuracy Depth Maps", IEEE Conference on Computer Vision and Pattern Recognition, Jun. 23, 2008, 8 pages.
"Restriction Requirement", U.S. Appl. No. 13/660,159, Jun. 12, 2014, 6 pages.
"Notice of Allowance", U.S. Appl. No. 13/309,982, Jul. 30, 2014, 6 pages.
"Notice of Allowance", U.S. Appl. No. 13/310,032, Aug. 26, 2014, 6 pages.
"Non-Final Office Action", U.S. Appl. No. 13/680,952, Aug. 4, 2014, 8 pages.
"Non-Final Office Action", U.S. Appl. No. 13/310,032, Mar. 7, 2014, 21 pages.
"Non-Final Office Action", U.S. Appl. No. 13/309,982, Mar. 24, 2014, 35 pages.
"Non-Final Office Action", U.S. Appl. No. 13/690,755, Mar. 28, 2014, 7 pages.
"Corrected Notice of Allowance", U.S. Appl. No. 13/660,159, Apr. 28, 2015, 2 pages.
"Corrected Notice of Allowance", U.S. Appl. No. 13/660,159, May 29, 2015, 2 pages.
"Final Office Action", U.S. Appl. No. 13/675,807, May 22, 2015, 24 pages.
"Final Office Action", U.S. Appl. No. 13/681,643, May 5, 2015, 14 pages.
"Notice of Allowance", U.S. Appl. No. 13/680,952, Mar. 17, 2015, 6 pages.
"Notice of Allowance", U.S. Appl. No. 13/690,755, Jun. 5, 2015, 6 pages.
"Supplemental Notice of Allowance", U.S. Appl. No. 13/680,952, Jun. 11, 2015, 3 pages.
"Adobe Audion", User Guide, 2003, 390 pages.
"MPEG Surround Specification", International Organization for Standardization, Coding of Moving Pictures and Audio; ISO/IEF JTC 1/SC 29/WG 11; Bangkok, Thailand, Jan. 19, 2006, 186 pages.
"Non-Final Office Action", U.S. Appl. No. 13/675,711, Mar. 11, 2015, 14 pages.
"Non-Final Office Action", U.S. Appl. No. 13/675,807, Dec. 17, 2014, 18 pages.
"Non-Final Office Action", U.S. Appl. No. 13/681,643, Jan. 7, 2015, 10 pages.
"Non-Final Office Action", U.S. Appl. No. 13/688,421, Feb. 4, 2015, 18 pages.
"Non-Final Office Action", U.S. Appl. No. 13/690,755, Mar. 2, 2015, 8 pages.
"Non-Final Office Action", U.S. Appl. No. 13/720,258, Mar. 3, 2015, 14 pages.
"Notice of Allowance", U.S. Appl. No. 13/660,159, Mar. 10, 2015, 6 pages.
"Restriction Requirement", U.S. Appl. No. 13/690,724, Feb. 26, 2015, 6 Pages.
Ioffe, "Improved Consistent Sampling, Weighted Minhash and L1 Sketching", ICDM '10 Proceedings of the 2010 IEEE International Conference on Data Mining, Dec. 2010, 10 pages.
Jehan, "Creating Music by Listening", In PhD Thesis of Massachusetts Institute of Technology, Retrieved from <http://web.media.mit.edu/~tristan/Papers/PhD_Tristan.pdf>,Sep. 2005, 137 pages.
"Adobe Audition 3.0 User Guide", 2007, 194 pages.
"Final Office Action", U.S. Appl. No. 13/675,711, Jun. 23, 2015, 14 pages.
"Final Office Action", U.S. Appl. No. 13/688,421, Jul. 29, 2015, 22 pages.
"Non-Final Office Action", U.S. Appl. No. 13/690,724, Jun. 18, 2015, 7 pages.
"Notice of Allowance", U.S. Appl. No. 13/675,807, Aug. 27, 2015, 6 pages.
"Notice of Allowance", U.S. Appl. No. 13/720,258, Jul. 24, 2015, 8 pages.
"Pre-Interview Communication", U.S. Appl. No. 13/720,316, Aug. 5, 2015, 3 pages.
"Supplemental Notice of Allowance", U.S. Appl. No. 13/690,755, Aug. 18, 2015, 4 pages.
"Notice of Allowance", U.S. Appl. No. 13/720,258, Sep. 18, 2015, 2 pages.
"Non-Final Office Action", U.S. Appl. No. 13/681,643, Oct. 16, 2015, 27 pages.
"First Action Interview Office Action", U.S. Appl. No. 13/720,316, Oct. 22, 2015, 4 pages.

\* cited by examiner

BELIEF PROPAGATION AND AFFINITY MEASURES

BACKGROUND

Labeling problems may be solved to support a variety of different functionality. Labels, for instance, may be assigned to nodes to describe characteristics of the node. The labels may be used to describe the characteristics of the node that involve the node itself, characteristics of the node in relation to another node, and so on.

Labeling problems may employ beliefs that may be used to assist in solving the labeling problem. For example, beliefs may be formed for nodes that describe a particular characteristic of the node that is to be labeled and therefore a belief for the node may pertain to a label that is to be assigned to the node. These beliefs may also be shared between nodes to assist in solving a label for other nodes. In this way, nodes may leverage knowledge passed to the node from other nodes to solve a labeling problem for the node. However, in some instances passing of these beliefs between nodes may actually hinder accuracy in solving the labeling problem for the node. Thus, conventional techniques may be forced to unlearn this knowledge in order to arrive at a correct label for a node, which may cause an increase in resource usage and therefore cause these conventional techniques to be ill suited for certain applications, such as applications that involve user interaction.

SUMMARY

Belief propagation and affinity measure techniques are described. In one or more implementations, beliefs may be formed to solve a labeling problem for a node, such as to perform image processing. An affinity measure may be calculated that describes how similar the node is to another node. This affinity measure may then be used as a basis to determine whether to share the belief formed for the node with the other node to solve a labeling problem for the other node.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Labeling problems may employ a sharing of beliefs to assist in solving for a label for a node. This may be used to describe a characteristic involving the node, such as a relationship of the node to another node, a characteristic of the node itself, and so on.

One technique that may be used to solve a labeling problem is referred to as hierarchical belief propagation. In hierarchical belief propagation, beliefs are first formed that describe a label that the node "believes" is to be assigned to the node. These beliefs may then be shared between nodes at a level in a hierarchy to be used at least is part in solving for a label for each of the nodes. The beliefs may also be shared between parent and child nodes, such as to assist a child node in solving a labeling problem for that node using beliefs arrived at for the parent node. However, in some instances these beliefs may cause additional processing and inaccuracies instead. For example, the beliefs may cause an inaccurate assumption to be used in the solving of the labeling problem for the child node, which is then unlearned during the solving of the problem to arrive at an accurate result and/or may even result in an incorrect label.

Accordingly, belief propagation techniques may be employed that leverage an affinity measure to manage usage of beliefs by the nodes. For example, the affinity measure may be used to determine a similarity/difference of a child node in comparison to a parent node. The affinity measure may therefore be used as a basis to determine whether the child node is to use beliefs arrived at for the parent node to solve the labeling problem. Thus, in this example if the parent and child nodes are sufficiently similar as indicated by the affinity measure, the child node may leverage beliefs of the parent node in solving the labeling problem for the child node.

However, in instances in which the parent and child nodes are not sufficiently similar as indicated by the affinity measure, the child node does not leverage the beliefs of the parent node. In response, the child node may take a variety of different actions. For example, the child node may leverage beliefs of a neighbor of the parent node if the affinity measure indicates that the neighbor and the child node are sufficiently similar. This process may continue to find a sufficiently similar node. If a sufficiently similar node is not found, the labeling problem for the child node may be solved without leveraging beliefs from another node. In this way, the labeling problem for the child node may be solved without using beliefs that are likely inaccurate.

These techniques may be used to support a variety of different functionality, such as network management, sound processing, image processing, and so on. For example, image processing may leverage these techniques to solve labeling problems involved in calculation of stereo correspondence, matting, stereo vision, and so forth. Therefore, although the following discussion is described in relation to calculation of stereo correspondence it should be readily apparent that these techniques may be used to support a variety of other functionality without departing from the spirit and scope thereof.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
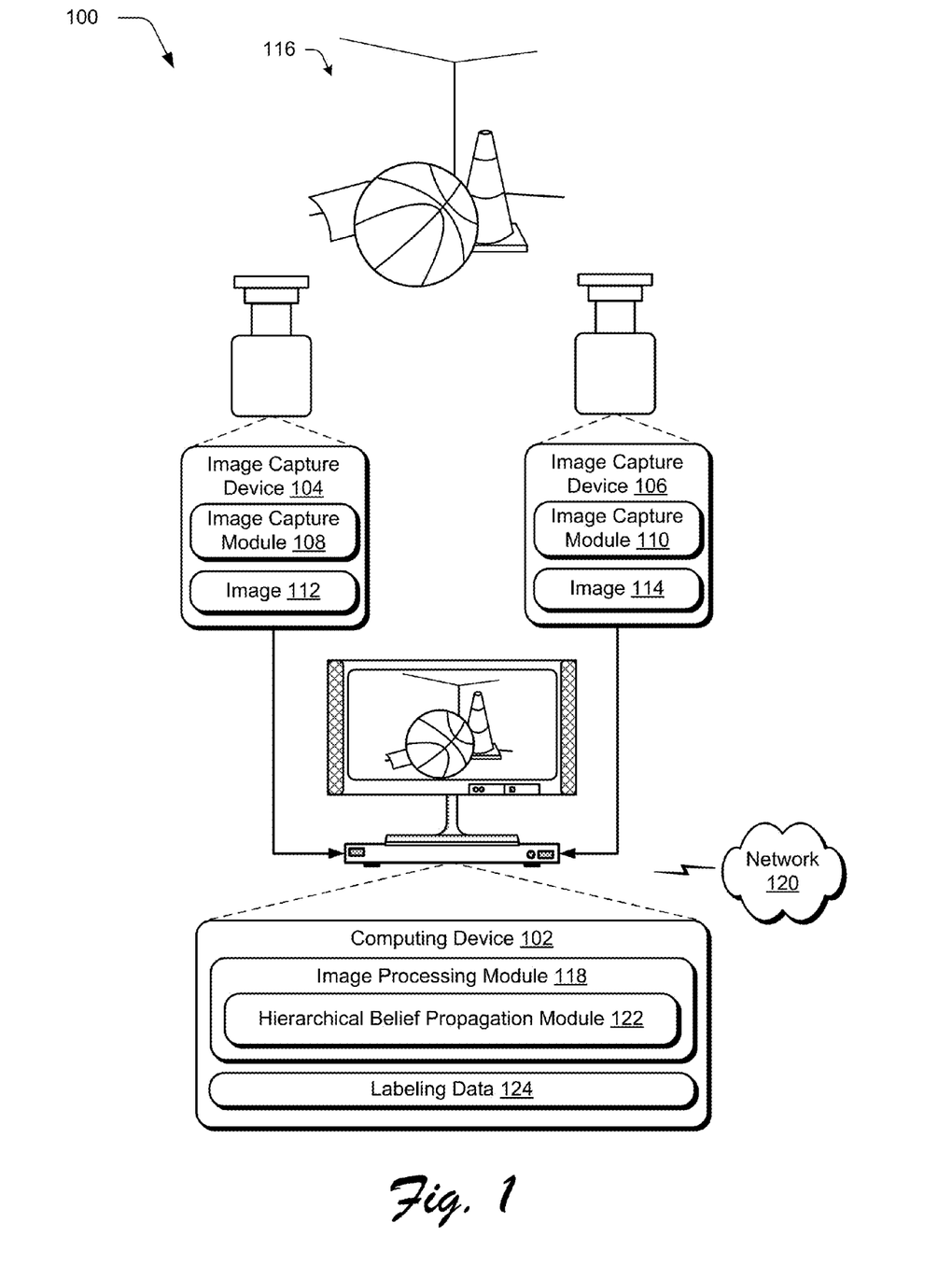
FIG. 1 is an illustration of an environment in an example implementation that is operable to employ techniques described herein.

FIG. 1 is an illustration of an environment 100 in an example implementation that is operable to employ techniques described herein. The illustrated environment 100 includes a computing device 102 and a plurality of image capture devices 104, 106, which may be configured in a variety of ways.

The computing device 102, for instance, may be configured as a desktop computer, a laptop computer, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as further described in relation to FIG. 7.

The image capture devices 104, 106 may also be configured in a variety of ways. Illustrated examples of such configurations include a standalone camera such as a dedicated device, part of a mobile phone or tablet, and so on. Other examples are also contemplated. For example, each of the image capture devices 104, 106 may be configured as a single stereoscopic camera, scanner, copier, camera, mobile device (e.g., smart phone), and so forth. In another example, a single image capture device 104 may be used to capture multiple images of an image scene, such as the cone, ball, and room as illustrated.

The image capture devices 104, 106 are illustrated as including a respective image capture module 108, 110. The image capture modules 108, 110 are representative of functionality to capture respective images 112, 114, such as by including image sensors and other hardware and software components to capture, process, and/or store images 112, 114.

The images 112, 114 in this example are stereoscopic in that the images are taken from different viewpoints of the illustrated image scene 116. For example, the images 112, 114 may be viewable by a user to gain a perception of three dimensional depth of the image scene. As previously described, the images 112, 114 may also be usable to model the image scene in three dimensions. This may be performed in a variety of ways as further described below.

The computing device 102 is illustrated as including an image processing module 118. The image processing module 118 is representative of functionality to perform one or more techniques that are usable to process an image. Although illustrated as implemented locally on the computing device, functionality of the image processing module may also be implemented in a distributed environment, remotely via a network 120 (e.g., "over the cloud") as further described in relation to FIG. 10, and so on.

The image processing module 118 may leverage a variety of different techniques to support image processing. An example of this is illustrated as a hierarchical belief propagation module 122, which is representative of one example of functionality to solve a labeling problem. In the illustrated example, the hierarchical belief propagation module 122 is configured to generate labeling data 124 to be used in calculation of stereo correspondence, which may describe which pixels in stereoscopic images correspond to each other. The image processing module 118, for instance, may process images 112, 114 to determine depth of the image scene to perform three dimensional modeling, perform view synthesis, view interpolation, content manipulation, matting (e.g., object removal), support augmented reality (e.g., object insertion), and so on. This processing may be performed in a variety of ways, further description of which may be found in the following discussion and corresponding figure.

Figure 2:
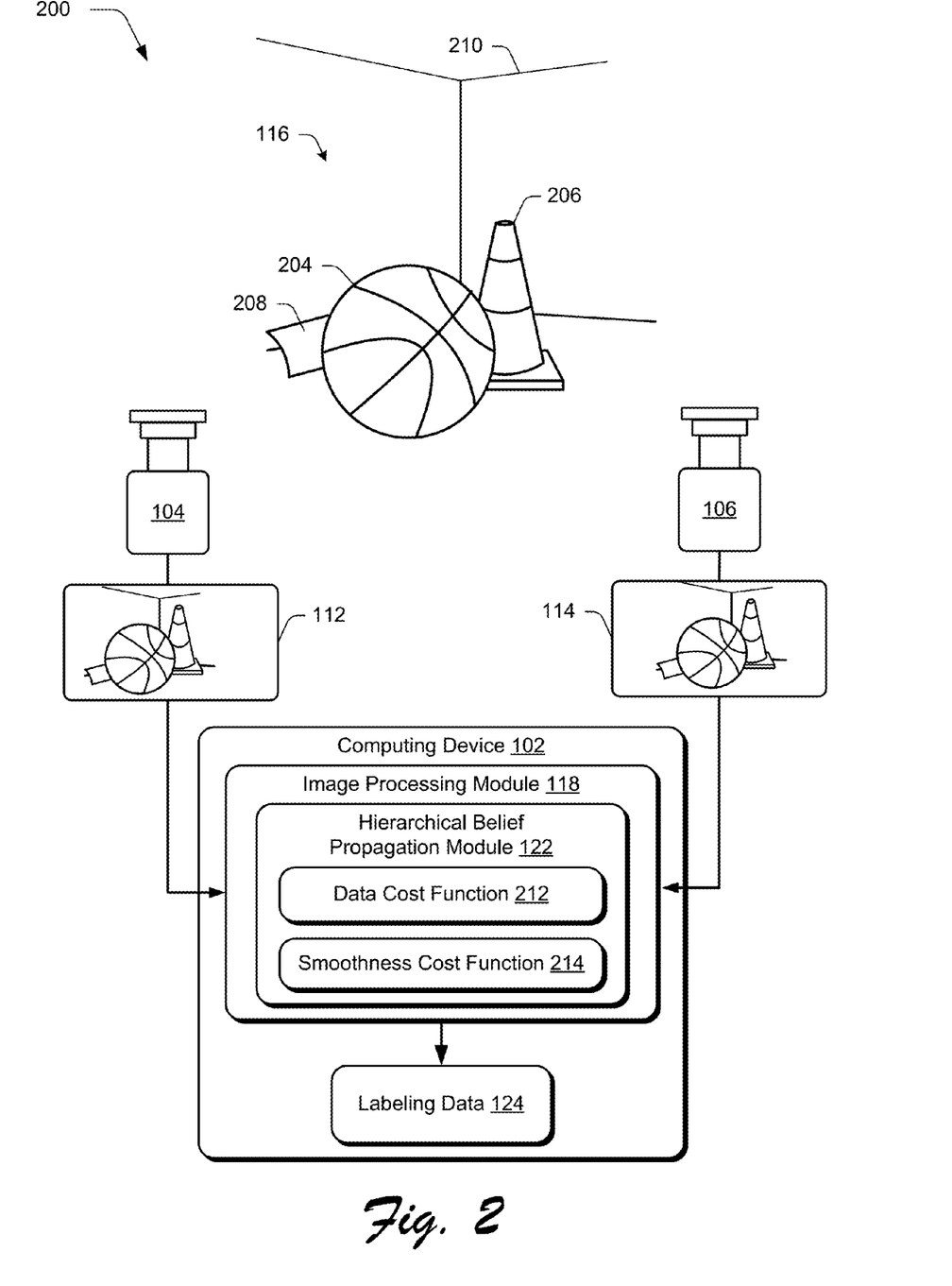
FIG. 2 depicts a system in an example implementation in which images are captured of an image scene and used in conjunction with the hierarchical belief propagation module to calculate stereo correspondence.

FIG. 2 depicts a system 200 in an example implementation in which images 112, 114 are captured of an image scene 116 and used in conjunction with the hierarchical belief propagation module 122 to calculate stereo correspondence. The image scene 116 is illustrated as including a ball 204, a traffic cone 206, and a piece of paper 208 in a white-walled room 210. The image capture devices 104, 106 are illustrated as capturing stereoscopic images 112, 114 of the image scene 116. As previously described, the stereoscopic images may be leveraged for a variety of purposes, such as for three dimensional modeling, view interpolation, and so on.

To support this functionality, the image processing module 118 may employ the hierarchical belief propagation module 122 to calculate labeling data 124 to be used to correspondence of pixels in the images 112, 114 to each other. For example, the hierarchical belief propagation module 122 may be used to arrive at labeling data 124 that assigns a discrete label to each pixel in an image based on an objective function. The objective function includes a "data term" as calculated using a data cost function 212 that gives the cost of assigning each potential label to a given pixel. The objective function also includes a "smoothness term" as calculated using a smoothness cost function 214 that specifies the cost of assigning each pair of potential labels to neighboring image pixels. This calculation may be performed by leveraging a measure of affinity between nodes that are to be used are part of the calculation, an example of which is described as follows and shown in a corresponding figure.

Figure 3:
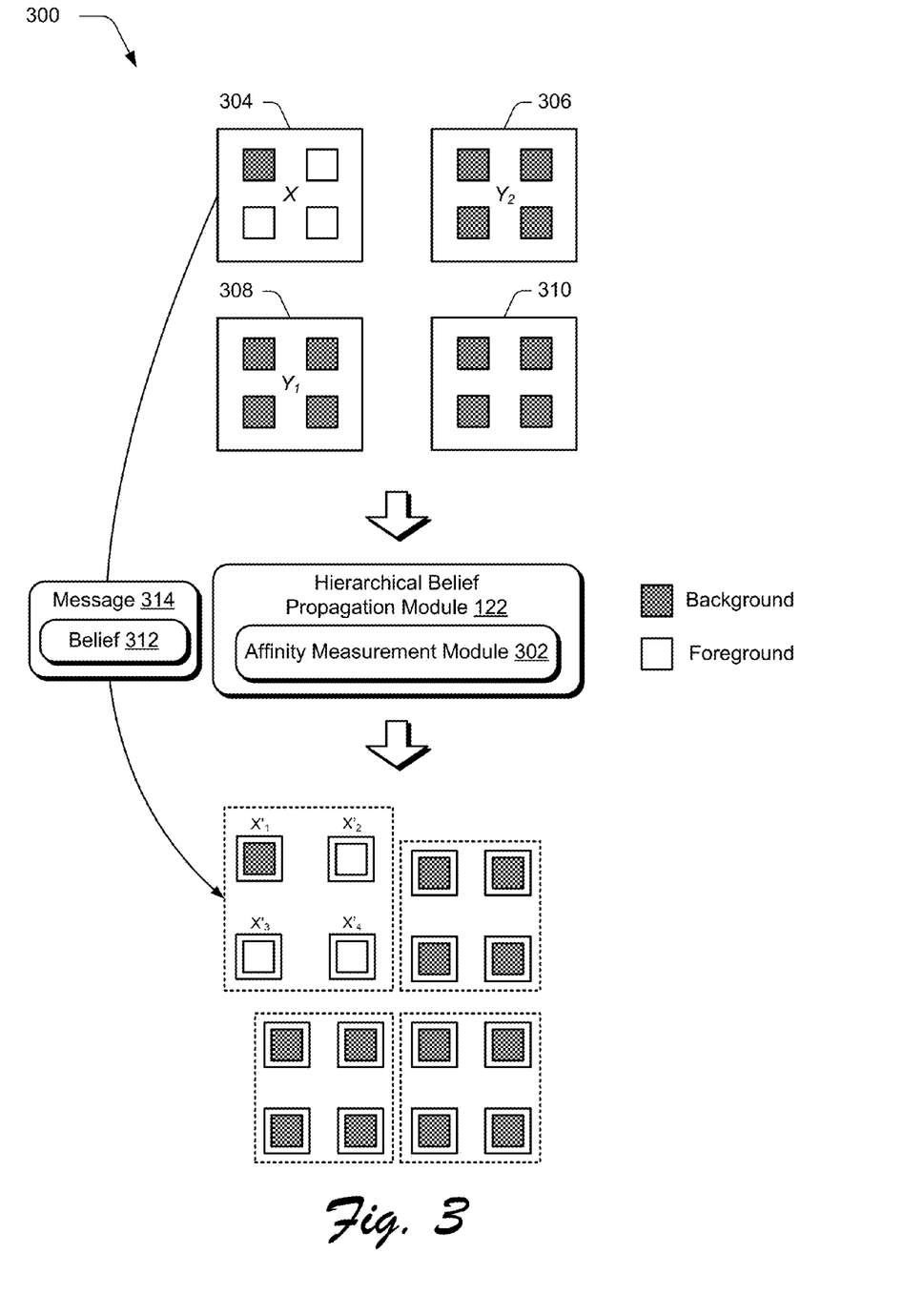
FIG. 3 depicts a system in an example implementation illustrating passing of messages that express beliefs of a parent node used to solve a labeling problem as being passed to a plurality of child nodes based on an affinity measure.

FIG. 3 depicts a system 300 in an example implementation illustrating passing of messages that express beliefs of a parent node used to solve a labeling problem as being passed to a plurality of child nodes based on an affinity measure. The hierarchical belief propagation module 122 may employ techniques to increase convergence speed by involving a reduced number of iterations to achieve convergence in the solving of a labeling problem. For example, the hierarchical belief propagation module 122 may employ an affinity measure module 302 which may be used to measure affinity between nodes. The affinity measure may then be used to manage communication between nodes to solve a labeling problem. If the measured affinity is indicative that the two nodes are not within a predefined measure of similarity, for instance, at least one of the nodes does not use beliefs arrived at for the other node to solve a labeling problem. This may be performed because the nodes are likely to have very different labels in an optimal labeling.

As shown in FIG. 3, for instance, nodes 304, 306, 308, 310 may defined for a first level of a hierarchy, which in this instance each of the nodes 304-310 includes a group of four pixels. Each of the pixels within the nodes 304-310 is illustrated as corresponding to a background or foreground for an image, which is illustrated through the use of cross hatching or lack of cross hatching in the figure.

In this example, the hierarchical belief propagation module 122 arrives at beliefs that are used to solve for a label for each of the nodes 304-310. Therefore, each of the nodes may be assigned a label as a whole. In this way, each of the nodes 304, 306, 308, 310 may be treated as a single pixel having a single label for that hierarchical level. Each of these labels may then be passed down as beliefs 312 via messages 314 to another level in a hierarchy to assist in solving labels for that level. In this example, the other level is a child level in which child nodes are individual pixels that are included in the pixels in the node "X" 304 that is the parent, which are illustrated as "$X'_1$," "$X'_2$," "$X'_3$," and "$X'_4$," in this example.

However, if the hierarchical level that is a higher resolution in this instance employs inaccurate beliefs 312 (e.g., incorrect labeling recommendations) of a lower resolution region (e.g., node 304), then additional processing is generally performed to "unlearn the bad advice" from the upper level in the hierarchy. This may slow down convergence of hierarchical belief propagation performed by the hierarchical belief propagation module 302.

Consequently, it may be better to start without any labeling bias at a higher resolution pixel than to start from incorrect labeling beliefs from the lower resolution level. Indeed, this modification may also improve the final accuracy of the labeling as it may be possible that label solving using convention techniques might not be able to overcome incorrect labeling advice from lower resolutions and would converge to a poor local minimum of the objective function.

In a stereo correspondence calculation, for instance, the labeling problem to be solved is to assign a disparity to each pixel in the stereo input pair. The disparities imply correspondences between the stereo images 112, 114. If the maximum movement of an object from one stereo image to the other is "$D_{max}$" pixels, then disparities of "0, 1, 2, ..., $D_{max}$" may be used as the potential labels to solve the stereo matching correspondence calculation.

In hierarchical belief propagation (HBP) as described above, the labeling problem is solved in a hierarchy. For example, at level 3 of the hierarchy a node may be defined by an 8 by 8 block of input resolution pixels, which is treated as a single low resolution pixel and assigned a single label. At level 2 of the hierarchy, a node includes a 4 by 4 block of input pixels that is also assigned a single label.

At level 1 as shown in FIG. 3, each node includes a 2 by 2 block of pixels that is also assigned a single label. At level 0 as also shown in FIG. 3, each pixel can be assigned to a different label individually as each node includes a single pixel. Level 0 is an input resolution configured to give a final answer in this example, i.e., to achieve a final result through assigning a label to each pixel individually. However, complications may arise in situations in which a parent node includes a plurality of child nodes that have very different labels. For example, a large block of input resolution pixels may include a minority of pixels that is to involve a different label than the majority. This is illustrated for node 304 that includes three pixels having a foreground label and a single pixel that has a background label, the differences are illustrated through use of and absence of hatching.

However, as previously described a single label is assigned to the node 304. Thus, the belief 312 for that node is to be used for each of the pixels in that node 304. Therefore, conventional techniques could result in passing of beliefs 312 that were incorrect, such as for use of belief 312 with pixel "$X'_1$," which would be incorrect as opposed to use of belief 312 by pixels "$X'_2$," "$X'_3$," and "$X'_4$." A conventional solution that was used to solve this problem was to simply run more message passing iterations at the next level between nodes at that level to attempt to overcome the incorrect beliefs passed on from the previous level. However, this could significantly slow processing and thus make use in some desired systems unusable, such as a system that involves user interaction to smooth disparities, fit models to predict disparities, and other user interactions with a user interface.

Accordingly, the hierarchical belief propagation module 122 may employ the affinity measurement module 302 to measure affinity of nodes that are to share beliefs 312. This measure of affinity may then be used to determine whether to share beliefs 312 between nodes. For example, in an instance in which the affinity measure indicates that the two nodes are likely to have quite different labels, beliefs are not shared for use in solving for the labeling problem. In this way, efficiency of the system 300 may be improved which may therefore be used to support a variety of different functionality. For example, a user may interact with a user interface to provide object category information (e.g., foreground/background in this figure) and this information may be used to accelerate the convergence of HBP, thereby supporting an interactive system with accurate results.

Continuing with the previous example, the hierarchical belief propagation module 302 may work in a coarse-to-fine manner. First, messages may be initialized as the coarsest level to zero. Belief propagation may then be applied at the coarsest level to iteratively refine the messages to arrive at the beliefs. The affinity measurement module 302 may then determine an affinity measurement between a node of a coarse level and child nodes at a "finer" level in the hierarchy. This affinity measurement may then be used to determine whether the message and beliefs are to be passed to initialize messages of the respective child nodes at this "finer" level of resolution. This may be performed by taking into consideration object category information for the nodes, e.g., foreground or background categorization, which in this instance is used as a basis for the affinity measure. Generally, in a finer level, if a child node and its parent node in a previous coarser level belong to the same object category (e.g., both are in background or foreground), then the child node inherits the messages from its coarser parent node for initializing messages in the child nodes at the current level.

If a child node and its parent node are in different categories, however, inheriting messages from its coarser level is likely to bring incorrect information to the current level. Therefore, it is reasonable in this instance not to inherit the messages 314 from its coarser level but instead initialize the messages in current level to zeros.

Specifically, "X" may represent a node including a plurality of pixels at a coarser level (having a single label as a whole), with its corresponding pixels at the finer level represented as "$X'_i$," and "i∈[1,4]." Let "$Y'_{i,j}$," and "j∈[1,4]" represent four neighbor nodes of pixel "$X'_i$" and "$Y_j$" are the corresponding four neighbors of pixel "X." Let "L" be the label of pixel "X" and "$L'_i$," be the label of its corresponding pixels at the finer level "$X'_i$." Then the message 314 passed to "$X'_i$" from "$Y'_{i,j}$," and "$j \in [1,4]$" may be initialized as:

$$M_{X'_i, Y'_{i,j}} = \begin{cases} M_{X,Y_j} & \text{if } L'_i = L \\ 0 & \text{otherwise} \end{cases} \quad i, j \in [1, 4]$$

The label "L" of a node "X" is determined in the following way. Let "F" and "B" be the set of foreground pixels (e.g., at finest level) and background pixels (e.g., at finest level) in "X," respectively. Then the label may be set as follows, e.g., where "1" represents foreground and "0" represents background:

$$L = \begin{cases} 1 & \text{if } num(F) \geq num(B) \\ 0 & \text{otherwise} \end{cases}$$

As shown in the figure, node "X" 304 is labeled as foreground as the number of foreground pixels is more than background pixels as indicated by the cross hatching Stepping to the next finer level, pixels "$X'_2$," "$X'_3$," and "$X'_4$," are also labeled as foreground. Thus an affinity measure calculated for the child nodes of individual pixels indicates similarity to the parent node and so these nodes will inherit the message 314 from the parent node "X" 304 for use in solving a labeling problem for those nodes, e.g., disparity.

However, child node "$X'_1$" is labeled as a background, and therefore an affinity measure for this child node and parent node "X" indicates that these nodes are not similar within a pre-defined measure. According, the child node "$X'_1$" does not inherit the message 314 that details beliefs 312 calculated for the parent node "X." As a result, the messages will be hierarchically refined by taking into account an affinity measure, such as object category information from user's object selection, color differences, textures, uniqueness, smoothness, and so on.

The initialization of messages for the child node "$X'_1$" may then be performed in a variety of ways. For example, this analysis may be repeated for neighbors of a parent node 304 to locate a node that is likely similar, an example of which is further described in relation to the following figure.

Figure 4:
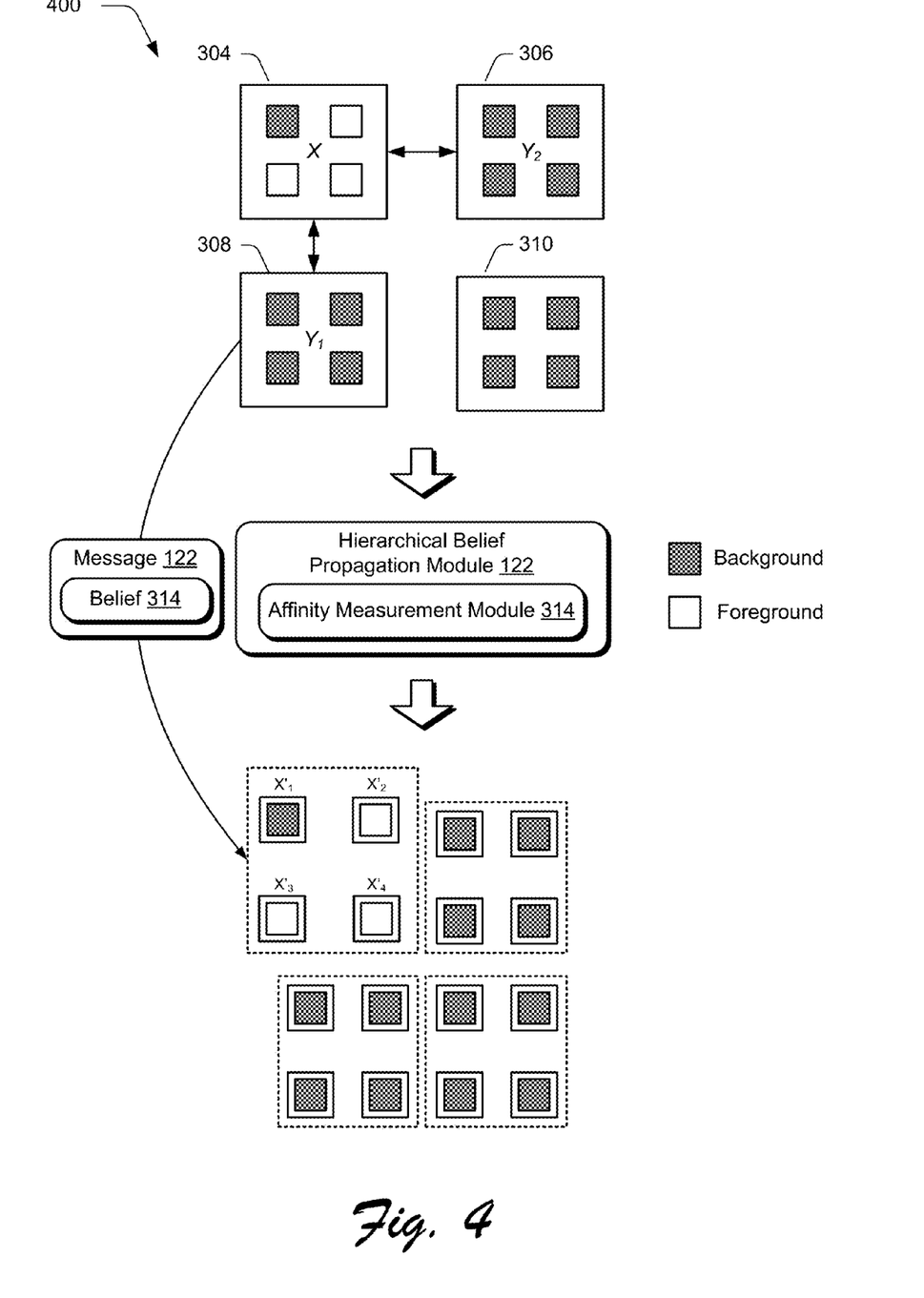
FIG. 4 depicts a system in an example implementation in which the affinity measurement module is employed to measure affinity of a child node with other nodes besides a parent node.

FIG. 4 depicts a system 400 in an example implementation in which the affinity measurement module 302 is employed to measure affinity of a child node with other nodes besides a parent node. As previously described, the parent node 304 "X" may leverage messages from neighboring nodes, e.g., nodes 306, 308, in solving a labeling problem for the node 304. The affinity measurement module 302 may be used as described in relation to FIG. 3 to control whether beliefs 314 are to be shared between parent and child nodes based on a measure of affinity. A measure of affinity may also be used to determine whether other beliefs are to be used to solve a labeling problem for the child node.

Continuing with the previous example of FIG. 3, a determination was made based on a measure of affinity between a child node "$X'_1$" and a parent node "X" that the solving of a labeling problem for the child node is not to employ beliefs arrived at for the parent node. Accordingly, in this example a determination may be made as to whether beliefs arrived at for neighboring nodes 306, 308 in a same hierarchical level of the parent node are likely to assist in solving a labeling problem of the child node or other node in a different hierarchical level.

Node 308, for instance, may be represented as node "Y" which has a corresponding label indicating a label of a background for the node and therefore a single label for a background may be used for the node "Y" 306. The affinity measurement module 302 may then calculate a measure of affinity as before to determine whether the node "$Y_1$" and child node "$X'_1$" are within a predefined measure of affinity, e.g., a same category in this example. In this instance, the measure of affinity is indicative of similarity and thus the child node "$X'_1$" in this instance employs beliefs 314 calculated for node "$Y_1$" 308 in solving the labeling problem for the child node.

This process may continue for other neighboring nodes of the parent level in the hierarchy in instances in which the measure of similarity indicates that the neighboring node "$Y_1$" 308 and the child node "$X'_1$" are not similar. If a similar node is not found, values of the child node "$X'_1$" may be initialized to zero such that the solving of the labeling problem "starts from scratch" without using messages from other nodes in a different hierarchical level, but may still employ messages from nodes in a same hierarchical level as described above. Other examples are also contemplated, such as to forgo the neighbor analysis and instead initialize the message values to zero for the child node in instances in which a parent node is determined to be dissimilar.

Although categorization was described, it should be readily apparent that a wide variety of other affinity measures may be employed as defined for a corresponding characteristic and as such the affinity measure module 302 may be used to determine whether a label for one node is to be used in solving a label for another node. In this way, the affinity measure may be used to constrain solving of the labeling problem Again, although an example of image processing is described, other image processing techniques may also leverage this functionality, such as for computer vision, segmentation, and so on. Further, these techniques may be leveraged to solve other labeling problems, such as for sound processing, network management and configuration, financial data analysis, and so on. Additional discussion of examples of these techniques may be found in relation to the following procedures.

Example Procedures

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-4.

Figure 5:
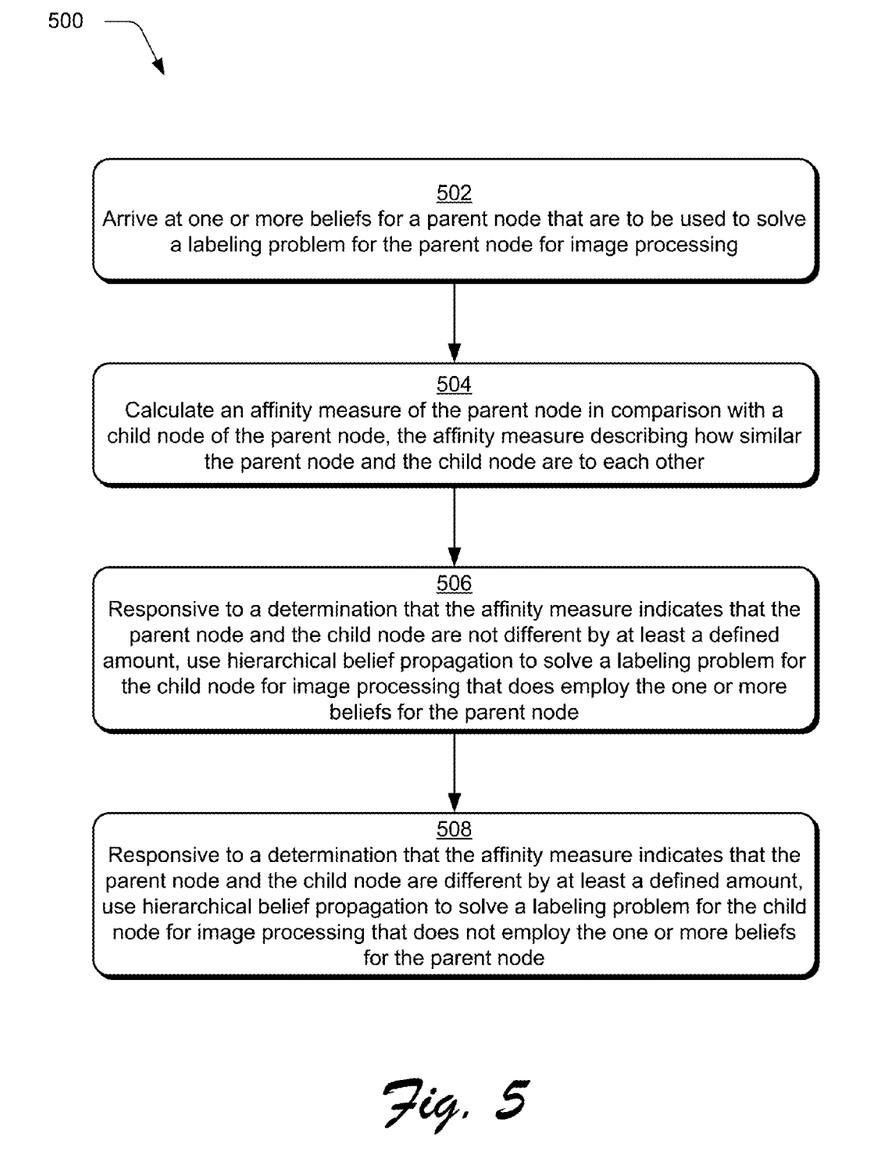
FIG. 5 is a flow diagram depicting a procedure in an example implementation in which an affinity measure is calculated and used to determine whether to employ beliefs of a parent node by a child node to solve a labeling problem.

FIG. 5 depicts a procedure 500 in an example implementation in which an affinity measure is calculated and used to determine whether to employ beliefs of a parent node by a child node to solve a labeling problem. One or more beliefs are arrived at for a parent node, the one or more beliefs be used in hierarchical belief propagation to solve a labeling problem for the parent node for image processing (block 502). For example, belief propagation may be used to arrive at a label to be used for a node "X" at a level in a hierarchy by sharing messages with other nodes at that level in the hierarchy.

An affinity measure is calculated of the parent node in comparison with a child node of the parent node, the affinity measure describing how similar the parent node and the child node are to each other (block 504). The affinity measure, for instance, may specify membership in a category, based on color comparison, for a plurality of different defined segments, be represented as a numerical value describing a difference in characteristics in the nodes, and so forth.

Responsive to a determination that the affinity measure indicates that the parent node and the child node are not different by at least a defined amount, hierarchical belief propagation is used to solve a labeling problem for the child node for image processing that does not employ the one or more beliefs for the parent node (block 506). For example, hierarchical belief propagation may be performed such that beliefs of the parent node may be used by a child node, such as to perform image processing and other label solving problems as previously described.

Responsive to a determination that the affinity measure indicates that the parent node and the child node are different by at least a defined amount, hierarchical belief propagation is used to solve a labeling problem for the child node for image processing that does not employ the one or more beliefs for the parent node (block 508). For example, hierarchical belief propagation may be performed such that beliefs for the parent node are not used by the child node, beliefs of a neighbor of the parent node are used by the child node based on an affinity measure, and so on as further described in relation to the following figure.

Figure 6:
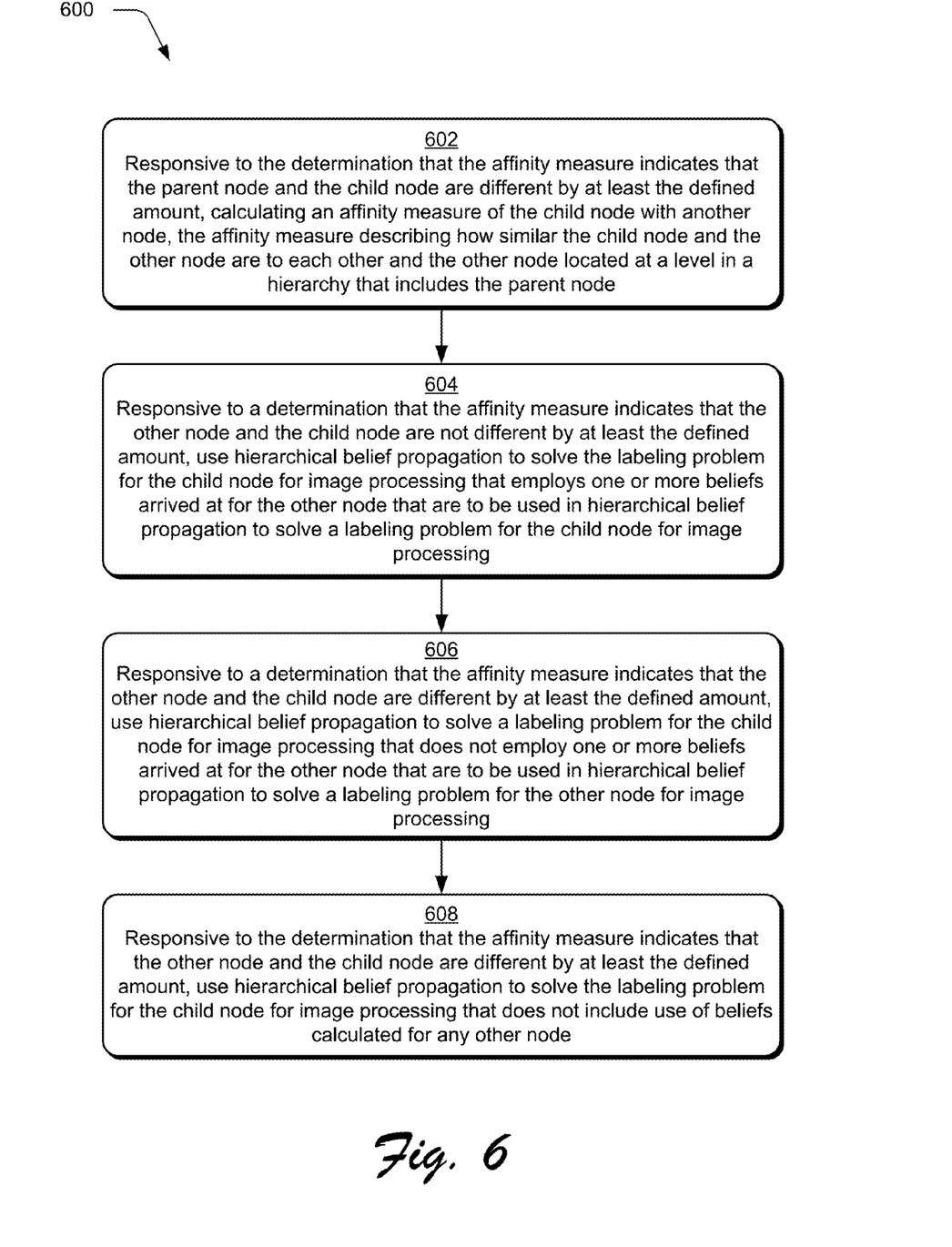
FIG. 6 is a flow diagram depicting a procedure in an example implementation in which an affinity measure is calculated and used to determine whether the employ beliefs of a neighbor of a parent node by a child node to solve a labeling problem.

FIG. 6 depicts a procedure 600 in an example implementation in which an affinity measure is calculated and used to determine whether the employ beliefs of a neighbor of a parent node by a child node to solve a labeling problem. Responsive to the determination that the affinity measure indicates that the parent node and the child node are different by at least the defined amount, an affinity measure of the child node is calculated in comparison with another node. The affinity measure describes how similar the child node and the other node are to each other and the other node is located at a level in a hierarchy that includes the parent node (block 602). As shown in FIG. 4, because the child node was determined to be different that the parent node 304, this calculation may be performed for a neighbor node 308 of the parent node 304.

Responsive to a determination that the affinity measure indicates that the other node and the child node are not different by at least the defined amount, hierarchical belief propagation is used to solve the labeling problem for the child node for image processing. The labeling problem is solved by employing one or more beliefs arrived at for the other node that are to be used in hierarchical belief propagation to solve a labeling problem for the child node for image processing (block 604). As before, beliefs calculated for the node 308 may be messaged 122 to the child node based on a determination that the nodes are likely similar as based on the affinity measurement.

Responsive to a determination that the affinity measure indicates that the other node and the child node are different by at least the defined amount, hierarchical belief propagation is used to solve a labeling problem for the child node for image processing that does not employ one or more beliefs arrived at for the other node that are to be used in hierarchical belief propagation to solve a labeling problem for the other node for image processing (block 606). Again, if the nodes are different as based on an affinity measure, the message 122 is not passed between the nodes to solve the labeling problem.

Responsive to the determination that the affinity measure indicates that the other node and the child node are different by at least the defined amount, hierarchical belief propagation is used to solve the labeling problem for the child node for image processing that does not include use of beliefs calculated for any other node (block 608). As previously described, the process of looking for similar nodes may be iterative and if a similar node is not found the child node may "start from scratch" without using beliefs calculated from another level in the hierarchy. Other examples are also contemplated without departing from the spirit and scope thereof.

Example System and Device

Figure 7:
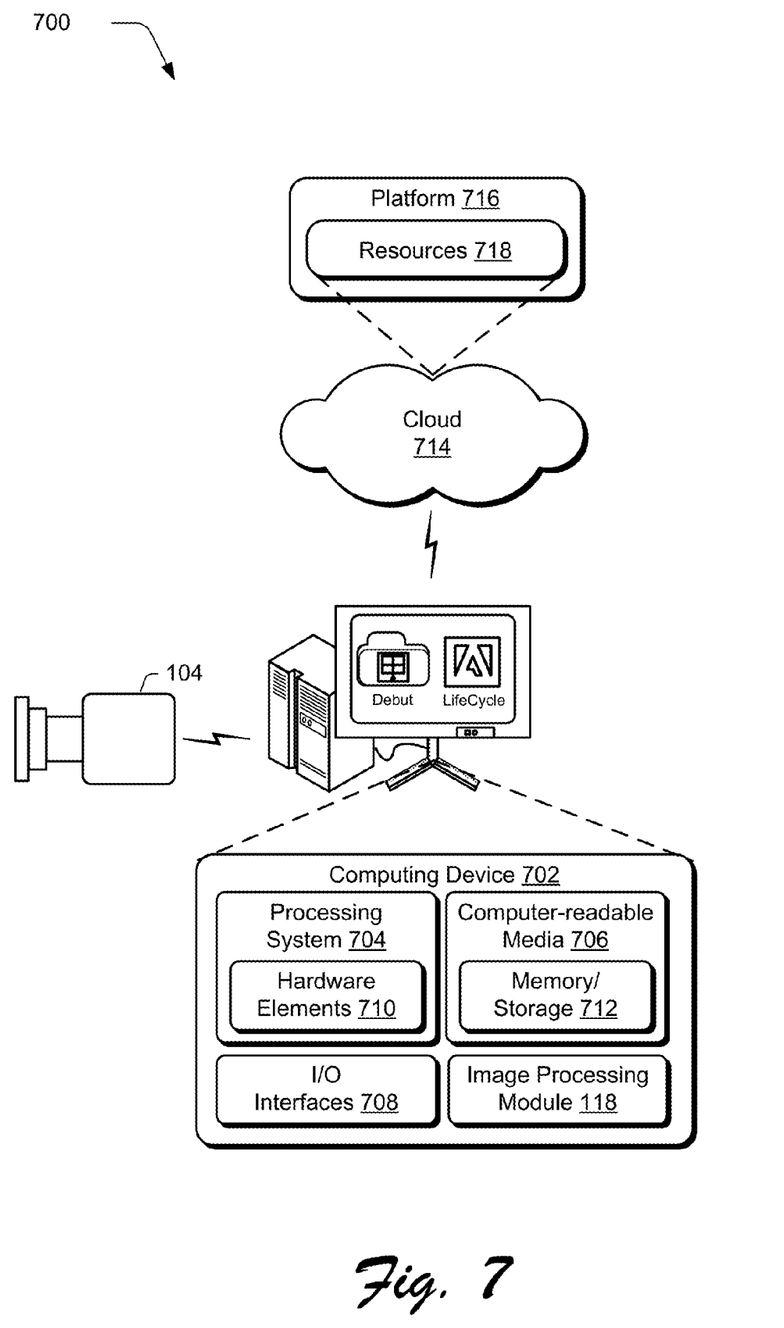
FIG. 7 illustrates an example system including various components of an example device that can be implemented as any type of computing device as described and/or utilize with reference to FIGS. 1-6 to implement embodiments of the techniques described herein.

FIG. 7 illustrates an example system generally at 700 that includes an example computing device 702 that is representative of one or more computing systems and/or devices that may implement the various techniques described herein. This is illustrated through inclusion of the image processing module 118, which may be configured to process image data, such as image data captured by an image capture device 104. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by one or more computing devices, the method comprising:
arriving at one or more beliefs for a parent node that are to be used to solve a labeling problem for the parent node for image processing;
calculating an affinity measure of the parent node in comparison with a child node of the parent node, the affinity measure describing how similar the parent node and the child node are to each other, the parent node and child node being in different hierarchical levels; and
responsive to a determination that the affinity measure indicates that the parent node and the child node are different by at least a defined amount, using hierarchical belief propagation to solve a labeling problem for the child node for image processing that does not employ the one or more beliefs for the parent node.

2. A method as described in claim 1, further comprising responsive to a determination that the affinity measure indicates that the parent node and the child node are not different by at least the defined amount, using hierarchical belief propagation to solve the labeling problem for the child node for image processing that does employ the one or more beliefs for the parent node.

3. A method as described in claim 1, further comprising responsive to the determination that the affinity measure indicates that the parent node and the child node are different by at least the defined amount, calculating an affinity measure of the child node with another node, the affinity measure describing how similar the child node and the other node are to each other and the other node located at a level in a hierarchy that includes the parent node.

4. A method as described in claim 3, further comprising responsive to a determination that the affinity measure indicates that the other node and the child node are not different by at least the defined amount, using hierarchical belief propagation to solve the labeling problem for the child node for image processing that employs one or more beliefs arrived at for the other node that are to be used in hierarchical belief propagation to solve a labeling problem for the other node for image processing.

5. A method as described in claim 3, further comprising responsive to a determination that the affinity measure indicates that the other node and the child node are different by at least the defined amount, using hierarchical belief propagation to solve a labeling problem for the child node for image processing that does not employ one or more beliefs arrived at for the other node that are to be used in hierarchical belief propagation to solve a labeling problem for the other node for image processing.

6. A method as described in claim 5, further comprising responsive to the determination that the affinity measure indicates that the other node and the child node are different by at least the defined amount, using hierarchical belief propagation to solve the labeling problem for the child node for image processing that does not include use of beliefs calculated for any node located at a level of a hierarchy that includes the parent node.

7. A method as described in claim 1, wherein the image processing is performed to label pixels of the parent node, the parent node including one or more pixels of the child node.

8. A method as described in claim 1, wherein the image processing includes calculation of stereo correspondence.

9. One or more non-transitory computer-readable storage media comprising instructions that are stored thereon that, responsive to execution by a computing device, causes the computing device to perform operations comprising:
arriving at one or more beliefs for a node that are to be used as part of a labeling problem for the node;
calculating an affinity measure of the node in comparison with at least one or more other nodes in a different hierarchical level, the affinity measure describing a similarity of the node to the one or more other nodes; and
responsive to a determination that the affinity measure indicates that the similarity is within a pre-defined amount, using the one or more beliefs for the node as part of solving a labeling problem for the one or more other nodes.

10. One or more non-transitory computer-readable storage media as described in claim 9, further comprising responsive to a determination that the affinity measure indicates that the similarity is not within the pre-defined amount, solving the labeling problem for the one or more other nodes without using the one or more beliefs for the node.

11. One or more non-transitory computer-readable storage media as described in claim 10, further comprising responsive to the determination that the affinity measure indicates that the similarity is not within the pre-defined amount, calculating an affinity measure of the one or more other nodes with at least one other node, the affinity measure describing similarity of the one or more other nodes with the at least one other node.

12. One or more non-transitory computer-readable storage media as described in claim 11, wherein the at least one other node is a neighbor to the node in a hierarchical level that include the at least one other node and the node.

13. One or more non-transitory computer-readable storage media as described in claim 11, further comprising responsive to a determination that the affinity measure indicates that the similarity is within the pre-defined amount for the one or more other nodes and the at least one other node, solving the labeling problem for the one or more other nodes using one or more beliefs arrived at for the at least one node to solve a labeling problem for the at least one other node.

14. One or more non-transitory computer-readable storage media as described in claim 11, further comprising responsive to a determination that the affinity measure indicates that the similarity is not within the pre-defined amount for the one or more other nodes and the at least one other node, solving the labeling problem for the one or more other nodes without using one or more beliefs arrived at for the at least one node to solve a labeling problem for the at least one other node.

15. One or more non-transitory computer-readable storage media as described in claim 11, wherein the node and the one or more other nodes have a parent/child relationship.

16. One or more non-transitory computer-readable storage media as described in claim 11, wherein the solving of the labeling problem is performed using hierarchical belief propagation.

17. A system comprising:
one or more processors;
one or more computer-readable storage media;
at least one module implemented at least partially in hardware, the at least one module configured to arriving at one or more beliefs for a parent node that are to be used in hierarchical belief propagation to solve a labeling problem for pixels in the parent node; and
one or more modules implemented at least partially in hardware, the one or more modules configured to:
calculate an affinity measure of the parent node in comparison with a child node, the affinity measure describing how similar the parent node and the child node are to each other, the parent node and child node being in different hierarchical levels;
responsive to a determination that the affinity measure indicates that the similarity is within a pre-defined amount, using hierarchical belief propagation to solve the labeling problem for one or more pixels in the child node using the one or more beliefs that were arrived at for the parent node; and
responsive to a determination that the affinity measure indicates that the similarity is not within the pre-defined amount, using hierarchical belief propagation to solve the labeling problem for one or more pixels in the child node without using the one or more beliefs that were arrived at for the parent node.

18. A system as described in claim 17, wherein the labeling problem is used at least in part to determine stereo correspondence.

19. A system as described in claim 17, wherein the affinity measure is based on similarity of color of the pixels in relation to each other.

20. A system as described in claim 17, wherein the affinity measure is based at least in part on whether the pixels are likely included in a foreground or background of an image, respectively.

* * * * *